NO PRINTED SPECIFICATION AVAILABLE.
O. Badger.
BEST AVAILABLE COPY
8,773 - X Feather Renovator.
Patented Apr. 22, 1835.
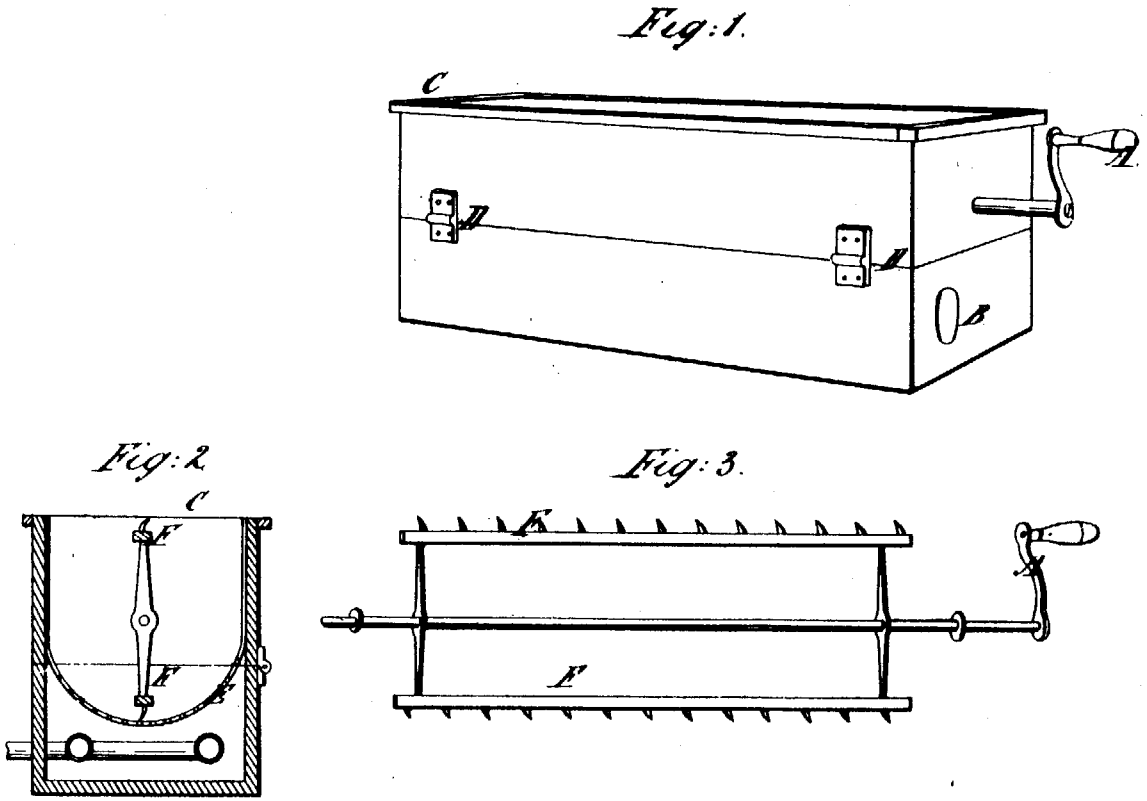
H. PETERS, PHOTO-LITHOGRAPHER, WASHINGTON, D. C.

8773X Apr 22 1835 [illegible]

Ousley Badger of [illegible] . New York

Letters Patent.

The schedule referred to in these Letters Patent and making part of the same [illegible] description in the words of the said Ousley Badger himself of his improvement in a machine for cleaning and drying feathers To all whom it may concern.

Be it known that I Ousley Badger of [illegible] in the County of Allegany and State of New York, have invented an improved machine for cleaning and drying feathers. And I do hereby declare that the following is a full and exact description thereof. The machine may of course vary in its dimensions according to the quantity of feathers which are to be acted upon at one operation. The measurements therefore which I may indicate are only to be considered as relative and belonging to one of ordinary size. I make a box or receptacle for the feathers of [illegible] - this box may be six feet long, two feet six inches wide and three feet deep. its lower half constitutes a semicylinder placed horizontally, and above this part the sides may rise vertically. A reel or revolving rakes is placed within this box, so that [illegible] of bulk or pins placed upon it shall come nearly in contact with the cylindrical bottom and stir up the feathers. one of the gudgeons of the shaft passing through the end of the box to communicate the requisite motion to it. The cover of the box may consist of cloth stretched upon a suitable frame. The bottom of it is to be punctured with numerous holes to admit of the passing of heated air into it and to allow of the escape of the dust ... separated from the feathers in the process of drying. Immediately beneath the before described box, I place stoves or flues which may be fed with fuel through suitable openings at each end of the machine. these stoves or flues are so arranged as to distribute the heat as equally as possible under every part of the box and to [illegible]

8773X

[illegible] lined in the frame of [illegible]: plates of metal are placed be-
tween the upper side of the flues and the bottom of the box;
A depth of about a foot may be allowed for these lower flues.
A frame or rectangular box of wood is made to enclose the parts
[illegible] described. The interior of this box I line with
sheet iron, or in preference with tin plate, the wood being a bad
conductor of heat will prevent its dissipation, and the absence
of brick work about the fire will leave the apparatus sufficiently
light to render it altogether portable, and constantly ready
for use. For the purpose of discharging the feathers I divide
the wooden box into two parts, at or near its middle horizon-
tally and hinge these parts together on one side, by which
arrangement the feathers when dressed, can all be emptied out
by turning the upper part over. When feathers are to be dressed
I put them into the before named receptacle and pour or sprinkle
in over them a small quantity of water and when the fire has been
lighted in the stove keep the feathers in constant motion by turn-
ing the revolving reel or rake. As the water evaporates the feathers
will become perfectly lively and the dust will be separated from
them so as to render them clean, a previous washing being rarely
if ever found necessary.

What I claim as my Invention is the constructing of a ma-
chine for dressing and cleansing feathers furnished with a box or
receptacle such as I have described and in which they are stir-
red up or agitated by the revolution of a reel or rake in the man-
ner set forth. I also claim the enclosing of the stove or flues with
a wooden box lined with metal, and the holes for the admission
of heated air, and the discharge of dust through the bot-
tom of the receptacle. I also claim the constructing of the
wooden box or frame in such a manner that the whole of the dressed
feathers may be discharged therefrom at once.

Testd.
[illegible] Witnesses { Joseph Hilbey
Robt Clarke }

Orestes Badger.

(Patented April 22 1835.) (756 Words)

(Drawing)